United States Patent
Bansal et al.

(10) Patent No.: US 9,231,878 B2
(45) Date of Patent: Jan. 5, 2016

(54) SHAPING VIRTUAL MACHINE COMMUNICATION TRAFFIC

(71) Applicant: Microsoft Technology Licensing, LLC, Redmond, WA (US)

(72) Inventors: Deepak Bansal, Redmond, WA (US); Priyank Ramesh Warkhede, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/610,666

(22) Filed: Jan. 30, 2015

(65) Prior Publication Data

US 2015/0142989 A1  May 21, 2015

Related U.S. Application Data

(63) Continuation of application No. 13/959,790, filed on Aug. 6, 2013, now Pat. No. 8,972,560, and a continuation of application No. 13/545,407, filed on Jul. 10, 2012, now Pat. No. 8,533,356, and a continuation of application No. 12/724,507, filed on Mar. 16, 2010, now Pat. No. 8,234,400.

(51) Int. Cl.
*G06F 15/16* (2006.01)
*H04L 12/815* (2013.01)
*H04W 4/00* (2009.01)
*H04L 29/08* (2006.01)
(Continued)

(52) U.S. Cl.
CPC *H04L 47/22* (2013.01); *G06F 9/54* (2013.01); *H04L 29/0863* (2013.01); *H04L 47/12* (2013.01); *H04W 4/003* (2013.01)

(58) Field of Classification Search
CPC ..... H04L 47/12; H04L 47/22; H04L 29/0863; H04W 4/003
See application file for complete search history.

(56) References Cited

U.S. PATENT DOCUMENTS 6,361,307 B1  3/2002  Bernhard
6,788,697 B1  9/2004  Aweya et al.
(Continued)

FOREIGN PATENT DOCUMENTS

CN  101640639 A  2/2010
JP  05219091 A  8/1993

OTHER PUBLICATIONS

Ravi S. Prasad, Marina Thottan, and T. V. Lakshman, "A Stateless and Light-Weight Bandwidth Management Mechanism for Elastic Traffic"—Published Date: 2008, http://ieeexplore.ieee.org/stamp/stamp.jsp?arnumber=04509802.

Yang Jie, Liu Jun, and Lei Zhenming, "BF-RED: A Novel Algorithm for Improving Bandwidth Fairness of RED"—Published Date: 2006, http://ieeexplore.ieee.org/stamp/stamp.jsp?arnumber=01673287.

(Continued)

*Primary Examiner* — Moustafa M Meky
(74) *Attorney, Agent, or Firm* — Ben Tabor; Kate Drakos; Micky Minhas

(57) ABSTRACT

Cloud computing platforms having computer-readable media that perform methods to shape virtual machine communication traffic. The cloud computing platform includes virtual machines and a controller. The controller limits the traffic associated with the virtual machines to enable the virtual machines to achieve desired communication rates, especially when a network servicing the virtual machines is congested. The controller may drop communication messages associated with the virtual machines based on a drop probability evaluated for the virtual machines.

20 Claims, 4 Drawing Sheets

(51) Int. Cl.
*G06F 9/54* (2006.01)
*H04L 12/801* (2013.01)

(56) References Cited

U.S. PATENT DOCUMENTS

| | | | |
|---|---|---|---|
| 6,826,150 | B1 | 11/2004 | Bhattacharya et al. |
| 7,149,187 | B1 | 12/2006 | Jacobson et al. |
| 7,283,470 | B1 | 10/2007 | Sindhu et al. |
| 7,324,442 | B1 | 1/2008 | Pan et al. |
| 7,336,672 | B1 | 2/2008 | Aweya et al. |
| 7,554,918 | B1 | 6/2009 | Moore |
| 7,571,181 | B2 | 8/2009 | Rhodes |
| 7,596,091 | B2 | 9/2009 | Sethi |
| 7,626,926 | B2 | 12/2009 | Abi-Nassif et al. |
| 7,760,633 | B2 | 7/2010 | Morandin |
| 7,787,370 | B1 | 8/2010 | Aweya et al. |
| 8,036,112 | B2 | 10/2011 | Labrador et al. |
| 8,234,400 | B2 | 7/2012 | Bansal et al. |
| 8,386,642 | B2 * | 2/2013 | Elzur ............ 709/241 |
| 8,462,624 | B2 | 6/2013 | McCanne et al. |
| 8,670,324 | B2 | 3/2014 | Cheung |
| 9,063,769 | B2 * | 6/2015 | Damola et al. ......... 1/1 |
| 2006/0075278 | A1 | 4/2006 | Kallahalla et al. |
| 2006/0193261 | A1 | 8/2006 | Sethi |
| 2006/0221825 | A1 | 10/2006 | Okano |
| 2006/0221990 | A1 | 10/2006 | Muller et al. |
| 2007/0121511 | A1 | 5/2007 | Morandin |
| 2007/0165531 | A1 | 7/2007 | Labrador et al. |
| 2008/0028398 | A1 | 1/2008 | Cherkasova et al. |
| 2008/0101354 | A1 | 5/2008 | Arndt |
| 2008/0267068 | A1 | 10/2008 | Lakshman et al. |
| 2010/0027425 | A1 | 2/2010 | Cheung et al. |
| 2010/0054129 | A1 | 3/2010 | Kuik et al. |
| 2010/0128605 | A1 * | 5/2010 | Chavan et al. ......... 370/230.1 |
| 2010/0223397 | A1 * | 9/2010 | Elzur ............ 709/235 |
| 2011/0013512 | A1 | 1/2011 | Morandin |
| 2012/0016986 | A1 | 1/2012 | Jacquet et al. |
| 2012/0304175 | A1 * | 11/2012 | Damola et al. ......... 718/1 |

OTHER PUBLICATIONS

Chia-Wei Chang and Bill Lin, "A Simple Mechanism for Throttling High-Bandwidth Flows"—Published Date: 2008, http://downloads.hindawi.comfjournals/jece/2008/704878.pdf.

Quality of Experience—Published Date: 2007, http://download.microsoft.com/download/3/a/3/3a367b0d-4ffi-44c5-9125-3ac5c037f195/OCS_QoE.doc.

Daniel Petri, Traffic Shaping With VMwart ESX Server, Petri IT Knowledgebase. [online]. Jan. 8, 2009, [searched in Aug. 30, 20111. <http://www.petri.co.il/traffic_shapi_with_vmware_esx_server.htm> See pp. 1-3.

Supplementary European Search Report mailed Mar. 27, 2014 in Application No. 11756769.3, 7 pages.

International Search Report mailed Nov. 28, 2011 in PCT Application No. PCT/US20111028159, 9 pages.

Chinese Office Action dated Jun. 24, 2014 in Application No. 201180013986.0, 18 pages.

Restriction Requirement/Election mailed Dec. 20, 2011 in U.S. Appl. No. 12/724,507, 5 pages.

Notice of Allowance mailed Apr. 2, 2012 in U.S. Appl. No. 12/724,507, 9 pages.

Notice of Allowance mailed Mar. 5, 2013 in U.S. Appl. No. 13/545,407, 8 pages.

Non Final Rejection mailed Nov. 21, 2012 in U.S. Appl. No. 13/545,407, 5 pages.

Restriction Requirement/Election mailed Sep. 13, 2012 in U.S. Appl. No. 13/545,407, 5 pages.

Notice of Allowance mailed May 20, 2013 in U.S. Appl. No. 13/545,407, 6 pages.

Non-Final Office Action dated Jun. 27, 2014 in U.S. Appl. No. 13/959,790, 6 pages.

Notice of Allowance dated Oct. 21, 2014 in U.S. Appl. No. 13/959,790, 5 pages.

"Second Office Action issued in Chinese Patent Application No. 201180013986.0", Mailed Date: Feb. 28, 2015, 8 Pages.

"Office Action issued in Japanese Patent Application No. 2013-500110", Mailed Date: Feb. 17, 2015, 9 Pages.

* cited by examiner

SHAPING VIRTUAL MACHINE COMMUNICATION TRAFFIC

PRIORITY

This application is a continuation of U.S. patent application Ser. No. 13/959,790, filed 6 Aug. 2013, which is a continuation of U.S. patent application Ser. No. 13/545,407, filed 10 Jul. 2012, which is a continuation of U.S. Pat. No. 8,234,400, issued 31 Jul. 2012, filed 16 Mar. 2010, which are each hereby incorporated herein by reference in their entirety.

BACKGROUND

Conventionally, cloud computing platforms host software applications in an Internet-accessible virtual environment. The cloud computing platform allows an organization to use datacenters designed and maintained by third parties. The conventional virtual environment supplies small or large organizations with requested hardware resources, software application resources, network resources, and storage resources. The virtual environment also provides application security, application reliability, application scalability, and application availability.

The conventional datacenters provide the physical computing resources, physical storage resources, and physical network resources. The physical resources in the data center are virtualized and exposed to the organizations as a set of application programming interfaces. The organizations do not need to maintain their own hardware resources or software resources, or maintain datacenters that are reliable and scalable.

The organizations may access these physical resources efficiently through the virtual environment without knowing the details of the software or the underlying physical hardware. In a conventional cloud computing platform, the hardware resources and software resources may be shared by organizations who do not trust each other. To prevent denial of service to any one organization, the conventional cloud platforms provide procedures that maintain equitable access to the shared resources. Most of the procedures require a significant amount of state information which increases computational and cost overhead in the cloud computing platform.

For instance, the sharing procedures may include leaky bucket, token bucket, and fair queuing. The leaky bucket procedure stores communication messages in a queue and transmits the communication messages at a constant rate. When the queue is full, communication messages are discarded. The token bucket procedure stores communication message in a queue and transmits the communication at a rate that is based on the number of tokens associated with the queue. Communication message may be discarded if the communication messages wait in the bucket for a predetermined time. The fair queuing procedure stores communication message in a queue and transmits the communication messages at a rate the is equal or proportional to the rate of experienced by other queues for other communication sessions. These procedures provide a mechanism to share resources in the cloud but have high CPU overhead because of the need to maintaining queues and associated state for the queues.

SUMMARY

Embodiments of the invention relate, in one regard, to cloud computing platforms, computer-readable media, and computer-implemented methods that shape virtual machine traffic in a cloud computing platform. The cloud computing platform includes controllers and virtual machines that are connected to a communication network. The controllers provide a stateless mechanism for shaping communication traffic with minimal overhead.

The controllers monitor traffic on the communication network. The controllers calculate an average communication rate for virtual machines connected to the communication network. In turn, a desired sending rate for the virtual machines is obtained by the controller. The controller determines a drop probability for the virtual machines based on the average communication rate. Communication messages in the network are dropped based on the drop probability for the virtual machines.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

DETAILED DESCRIPTION

Figure 1:
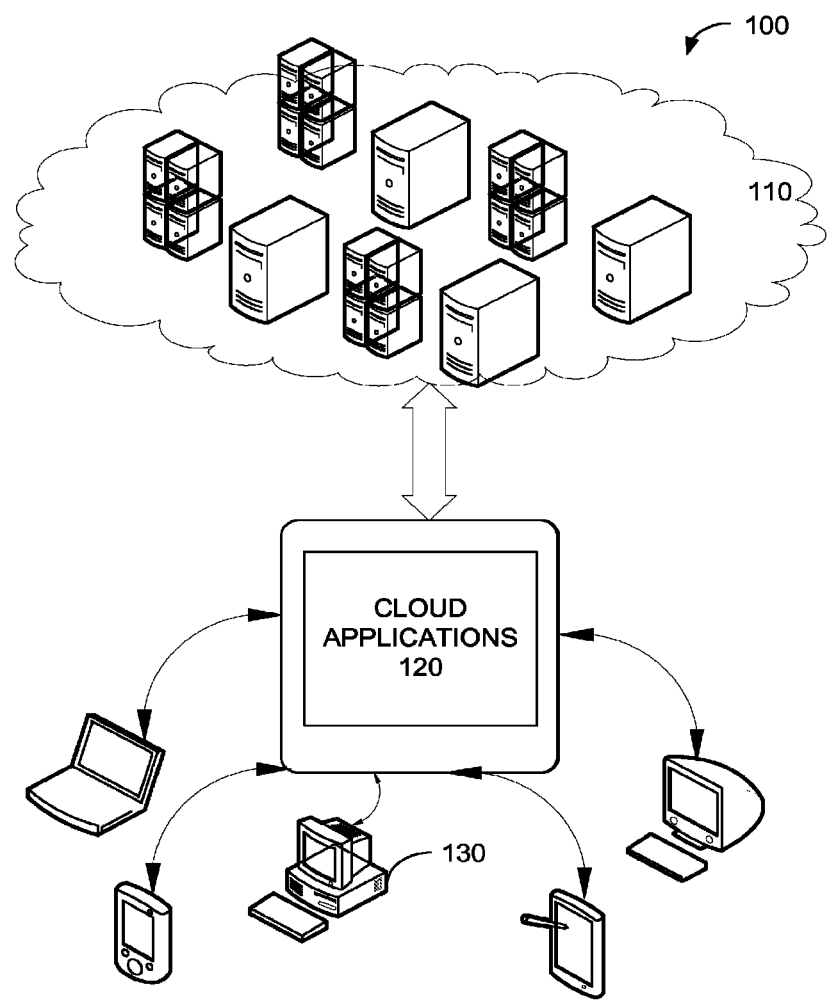
FIG. 1 is a network diagram that illustrates an exemplary cloud computing platform in accordance with embodiments of the invention.

This patent describes the subject matter for patenting with specificity to meet statutory requirements. However, the description itself is not intended to limit the scope of this patent. Rather, the inventors have contemplated that the claimed subject matter might also be embodied in other ways, to include different steps or combinations of steps similar to the ones described in this patent, in conjunction with other present or future technologies. Moreover, although the terms "step" and "block" may be used herein to connote different elements of methods employed, the terms should not be interpreted as implying any particular order among or between various steps herein disclosed unless and except when the order of individual steps is explicitly described. Further, embodiments are described in detail below with reference to the attached drawing figures, which are incorporated in their entirety by reference herein.

As utilized herein, the term "component" refers to any combination of hardware, software, and firmware.

The cloud computing platform enables sharing of hardware and software resources among virtual machines. In some embodiments, virtual machine traffic is limited to prevent resource starvation in the cloud computing platform. The cloud computing platform execute traffic shaping procedures that limit bandwidth utilized by the virtual machines. Accordingly, the cloud computing platform protects shared resources from malicious virtual machines that attempt to access excess resources to reduce accessibility by other virtual machines. The cloud computing platform also protects shared resources from inadvertent use of excess network resources by non-malicious virtual machines.

In some embodiments, the cloud computing platform utilizes a queueless and stateless mechanism to implement bandwidth limiting for the virtual machines. This mechanism keeps the overhead for each virtual machine low. In one embodiment, the communication messages for the virtual machines are transmission control protocol (TCP) communication messages, i.e., packets.

Bandwidth limiting allows an administrator of the cloud computing platform to set the bandwidth available to a given virtual machine based on the relationship with the virtual machine. For instance, a small virtual machine may be limited to 100 Mbps and a large virtual machine may be limited to 1 Gbps. Thus, desired communication rates may be set in service level agreements negotiated with each virtual machine in the cloud computing platform.

As one skilled in the art will appreciate, the cloud computing platform may include hardware, software, or a combination of hardware and software. The hardware includes processors and memories configured to execute instructions stored in the memories. In one embodiment, the memories include computer-readable media that store a computer-program product having computer-useable instructions for a computer-implemented method. Computer-readable media include both volatile and nonvolatile media, removable and nonremovable media, and media readable by a database, a switch, and various other network devices. Network switches, routers, and related components are conventional in nature, as are means of communicating with the same. By way of example, and not limitation, computer-readable media comprise computer-storage media and communications media. Computer-storage media, or machine-readable media, include media implemented in any method or technology for storing information. Examples of stored information include computer-useable instructions, data structures, program modules, and other data representations. Computer-storage media include, but are not limited to, random access memory (RAM), read only memory (ROM), electrically erasable programmable read only memory (EEPROM), flash memory or other memory technology, compact-disc read only memory (CD-ROM), digital versatile discs (DVD), holographic media or other optical disc storage, magnetic cassettes, magnetic tape, magnetic disk storage, and other magnetic storage devices. These memory technologies can store data momentarily, temporarily, or permanently.

In one embodiment, the cloud computing platform includes cloud applications that are available to client devices. The client devices access the cloud computing platform to execute the cloud applications on one or virtual machines. The cloud applications are implemented using storage and processing resources available in the cloud computing platform.

FIG. 1 is a network diagram that illustrates an exemplary computing system 100 in accordance with embodiments of the invention. In an embodiment, the computing system 100 shown in FIG. 1 is merely exemplary and is not intended to suggest any limitation as to scope or functionality. Embodiments of the invention are operable with numerous other configurations. With reference to FIG. 1, the computing system 100 includes a cloud computing platform 110, cloud applications 120, and client devices 130.

The cloud computing platform 110 is configured to execute cloud applications 120 requested by the client devices 130. The cloud computing platform 110 maintains computing devices that provide virtual machines, which execute the cloud application 120. The cloud computing platform also includes storage resources that store applications and system information. The cloud computing platform 110 connects to the client devices 130 via a communications network, such as a wireless network, local area network, wired network, or the Internet.

The cloud applications 120 are available to the client devices 130. The software executed on the cloud computing platform 110 implements the cloud applications 120. In one embodiment, virtual machines provided by the cloud computing platform 110 execute the cloud applications 120. The cloud applications 120 may include, but are not limited to, editing applications, network management applications, finance applications, or any application requested or developed by the client devices 130. In certain embodiments, some functionality of the cloud application 120 may be executed on the client devices 130.

The client devices 130 are utilized by a user to interact with cloud applications 120 provided by the cloud computing platform 110. The client devices 130, in some embodiments, must register with the cloud computing platform 110 to access the cloud applications 120. Any client device 130 with an account from the cloud computing platform 110 may access the cloud applications 120 and other resources provided in the cloud computing platform 110. The client devices 130 include, without limitation, personal digital assistants, smart phones, laptops, personal computers, gaming systems, set-top boxes, or any other suitable client computing device. The client devices 130 include user and system information storage to store user and system information on the client devices 130. The user information may include search histories, cookies, and passwords. The system information may include internet protocol addresses, cached Web pages, and system utilization. The client devices 130 communicate with the cloud computing platform 110 to receive results from the cloud applications 120.

Accordingly, the computing system 100 is configured with a cloud computing platform 110 that provides cloud applications 120 to the client devices 130. The cloud applications 120 remove the burden of updating and managing multiple local client applications on the client devices 130.

In certain embodiments, the cloud computing platform provides controllers that shape virtual machine communication traffic. The controllers provide a counter for each virtual machine. The counters may track the average sending rate of traffic. The cloud computing platform may evaluate an exponentially weighted average sending rate for the virtual machines. Based on the average sending rate, a drop rate is computed by the controller for each virtual machines. Communication messages are randomly dropped by the controller based on the computed average sending rate. In one embodiment, the drop probability may be set via policy included in the service level agreement governing the virtual machine. Alternatively, the drop probability may be triggered on demand by a central policy based on network congestion detected by the cloud computing platform.

Figure 2:
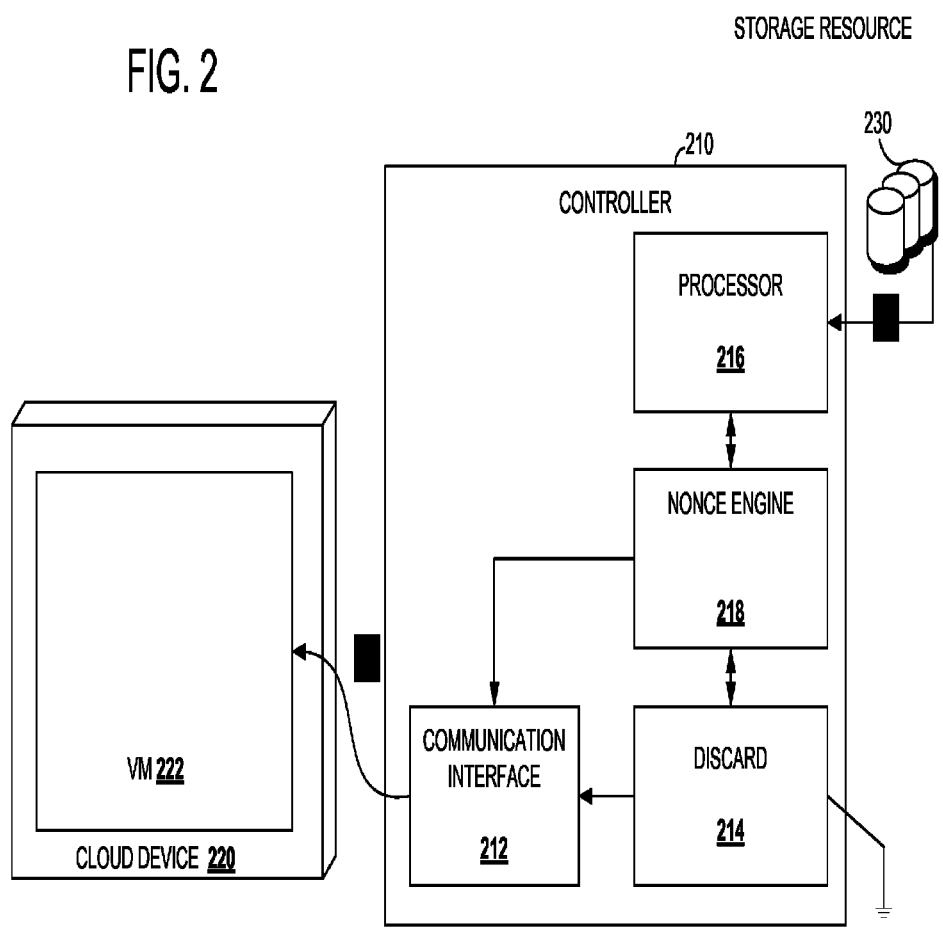
FIG. 2 is a block diagram that illustrates a communication system having exemplary controllers and virtual machines in the exemplary cloud computing platform in accordance with embodiment of the invention.

FIG. 2 is a block diagram that illustrates a communication system 200 having exemplary controllers 210 and virtual machines 222 in the exemplary cloud computing platform. The controller 210 is connected to a communication network. The communication network connects the cloud devices 220, and storage resources 230.

The controller 210 monitors communication traffic on the communication network associated with virtual machines 222 that execute the cloud applications. The controller 210 includes a communication interface 212, a discard loop 214, processor 216, and nonce engine 218. In certain embodiments, the controller 210 is configured to shape virtual machine communication traffic by discarding a fraction of the outbound traffic based on send rates detected for the virtual machines. The controller is able to shape traffic without maintaining queues for the virtual machines or communication sessions. The controller 210 measures a sending rate of each virtual machine and selects one or more communication messages for discarding at a determined probability.

The communication interface 212 receives the communication messages from the cloud devices 220 executing the virtual machines 222. The communication interface also transmits the communication messages to the cloud device 220 executing the virtual machines 222. The communication interface 212 may include, but is not limited to, Ethernet, or Asynchronous Transfer Mode (ATM) interfaces. The controller 210 may transmit a communication message to the cloud device 220 over the communication interface 212.

The discard loop 214 is used by the controller 210 to discard communication messages. The communication messages may be discarded by sending the message to an interface connected to ground. The communication messages are sent to the discard loop when the controller 210 determines that a virtual machine 222 has a drop probability above a specified threshold.

The processor 216 performs calculations for the controller 210. The calculations are used by the controller to determine whether to discard communication messages for a virtual machine 222. The calculations may include evaluating an average sending rate, a drop probability, and a nonce. Based on these calculations, the processor 216 may set a flag to discard one or more communication messages for the virtual machine 222.

The processor 216 obtains the current sending rate for the virtual machines 222 executed by cloud device 220. In another embodiment, the processor 216 may calculate the current sending rate each time a communication message is received from the virtual machines 222 by dividing the size of the communication message by the interval since last communication message was received by the controller 210 from the virtual machine 222. The current sending rate is used to determine a drop probability for the virtual machines 222 when the drop probability is not set in a service level agreement for the virtual machine 222. The service level agreement is stored in storage resource 230, which is accessed by the processor 216 to determine whether the drop probability is set.

In turn, the processor 216 calculates the average sending rate. In one embodiment, the average sending rate is an exponential average sending rate (ASR). The processor may evaluate ASR=α*previous_ASR+(1−α)*current_SR, where "α" is set by the cloud computing platform, the "previous_ASR" is the ASR previously evaluated for the virtual machines, and "current_SR" is the current sending rate detected for the virtual machines. "α" is a rational number. The exponential averaging uses less memory that other averaging function. In certain embodiments, the other averaging functions, e.g. mean sending rate. may be used.

The desired sending rate for the virtual machines 220 is accessed to evaluate the drop probability. The desired sending rate may be set in the service level agreement. In other embodiments, an administrator may set the desired sending rate in real time based on the network congestions. In yet another embodiment, the desired sending rate may be automatically set based on the congestion detected on the network. The desired sending rate may be automatically decreased as congestion on the communication network increases.

The processor 216 calculates the drop probability (DP). The processor evaluates $$DP = \frac{\beta*(ASR-DSR)}{ASR},$$

"β" is set by the cloud computing platform. β may be set by an administrator to reduce or increase the number of communication messages discarded. β ranges between 0 and 1.

The nonce engine 218 is a random number generator. It generates a random number for the processor 216. The nonce engine 218 may also provide the processor with the maximum random number. In turn, the processor 216 may generate a nonce (η) that is used as a threshold. The processor 216 evaluates $$\eta = \frac{Random\_Number}{Maximum\_Random\_Number},$$

"Random_Number" is the random number generated by the nonce engine 218, and "Maximum_Random_Number" is the maximum random number provided by the nonce engine 218. Both "Random_Number" and "Maximum_Random_Number" are rational numbers.

The processor 216 compares the nonce and drop probability. When the drop probability is greater than the nonce, the processor 216 may discard the communication message.

In some embodiments, the drop probability for a virtual machines 222 may be set by the service level agreement based on network congestion. For instance, when there is no network congestion is detected by the controller 210, the service level agreement may indicate that the average sending rate should be set to the desired sending rate. Hence, the drop probability is zero. And the virtual machine 222 is allowed unrestricted resource utilization. But when network congestion is detected by the controller 210, the average sending rate is set to a specific number, e.g., 50 Mbps, 20 Mbps, depending on the congestion level and the number of virtual machines 222 accessing the resources in the cloud computing platform.

Storage resources 230 store the cloud applications and the service level agreements for each virtual machine 222. In some embodiments, a virtual machine 222 may have multiple service level agreements. Each service level agreement may correspond to different cloud applications executed by the virtual machine. The service level agreements may set desired sending rate for the virtual machines 222, desired sending rates for the cloud applications, and desired sending rates for the cloud device 220. In some embodiments, the service level agreements may also store a drop probability for the virtual machines 222, drop probability for the cloud applications, and drop probability for the cloud device 220. The storage resource 230 may transmit service level agreements to the controller 210 in response to requests for the desired sending rate or drop probability.

In one embodiment, the cloud computing platform executes cloud applications on virtual machines running on cloud devices. The cloud computing platform shapes communication traffic for the virtual machines. The cloud computing platform monitors communications rates for the virtual machines and discards packets based on the communication rates. The communication rates may include transmission rates and reception rates.

Figure 3:
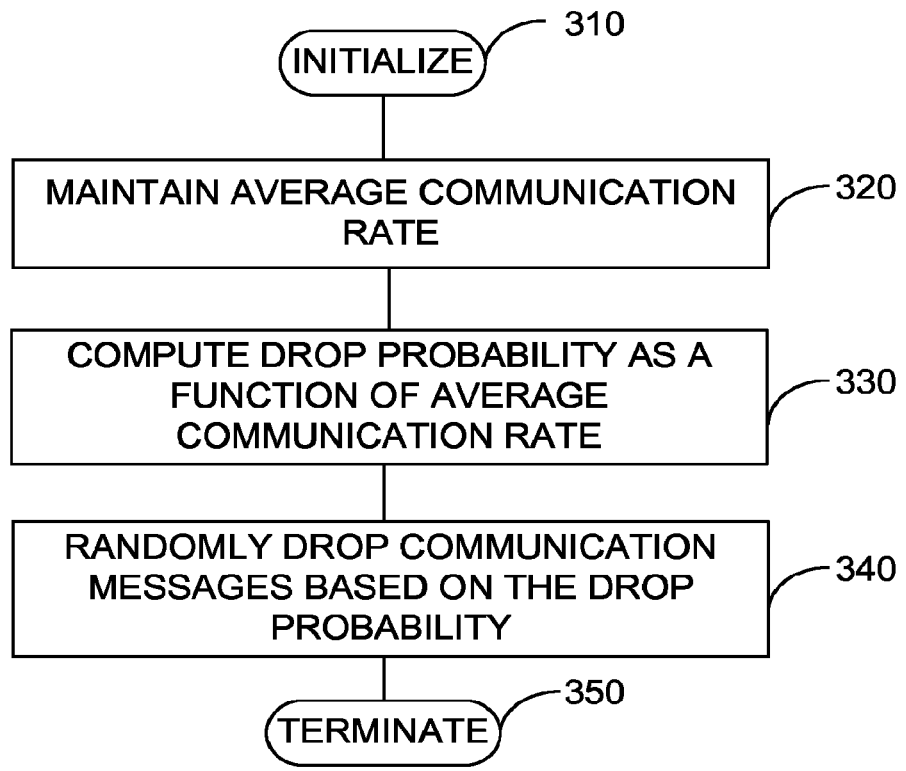
FIG. 3 is a logic diagram that illustrates an exemplary method to manage virtual machine communication traffic in accordance with embodiment of the invention.

FIG. 3 is a logic diagram that illustrates an exemplary method to manage virtual machine communication traffic.

The method initializes in step 310. The cloud computing platform maintains an average communication rate for the virtual machines in the cloud computing platform, in step 320. The cloud computing platform may use an exponential average or mean average for the virtual machine. In step 330, the cloud computing platform calculates a drop probability for the virtual machines as a function of the average communication rate and a desired communication rate for the virtual machines. The desired communication rate may be obtained from a storage resource storing service level agreements that specify the desired sending rate for the virtual machines. Alternatively, the desired sending rate may be set by an administrator of the cloud computing platform.

The cloud computing platform limits transmission communication messages or reception communication messages associated with the virtual machines to achieve the desired communication rates for virtual machines in the cloud computing platform. In one embodiment, the limiting of transmission communication messages or reception communication messages is triggered when the cloud computing platform detects congestion on a network servicing the virtual machines. In turn, the cloud computing platform randomly drops a communication message for the virtual machines when a drop probability for the virtual machines is greater than a nonce generated by the cloud computing platform, in step 340. The method terminates in step 350.

In some embodiments, the cloud computing platform shapes communication traffic based on sending rates for the virtual machines executing on cloud devices. The cloud computing platform may drop the communication messages to reduce overall network congestion. The cloud computing platform attempts to maintain an agreed service level for the virtual machines when deciding to whether to drop the communication message.

Figure 4:
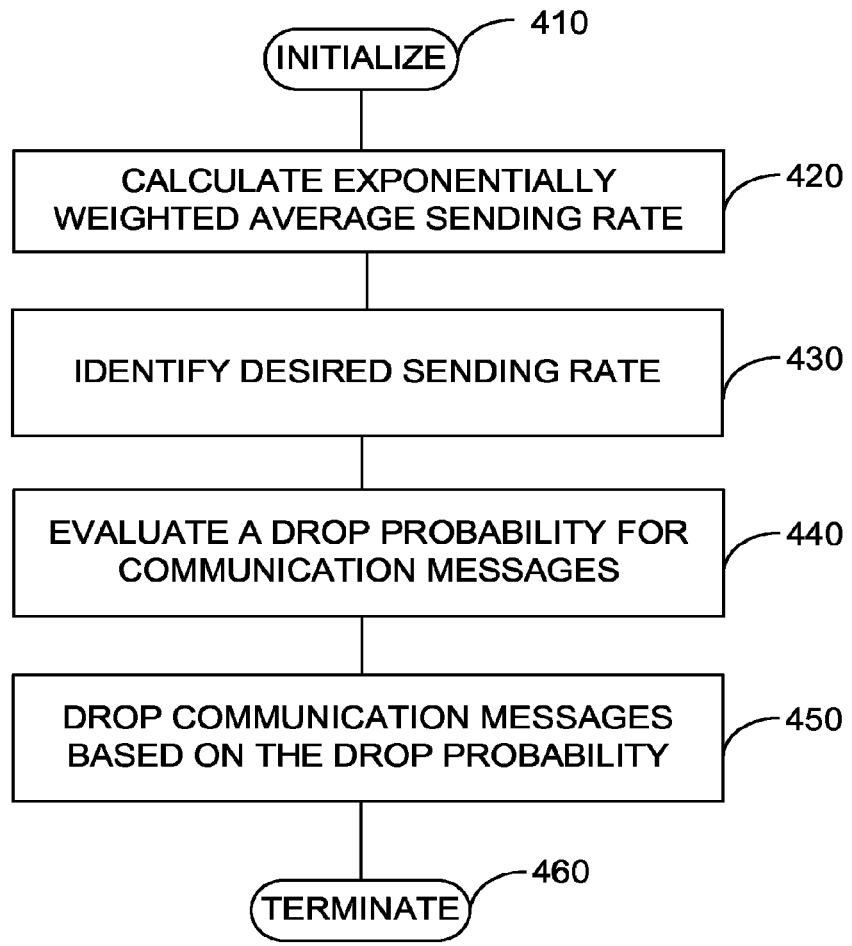
FIG. 4 is a logic diagram that illustrates an exemplary method to discard virtual machine communication traffic in accordance with embodiment of the invention.

FIG. 4 is a logic diagram that illustrates an exemplary method to discard virtual machine communication traffic. The virtual machine communication traffic may be governed by Transmission Control Protocol (TCP). The method initializes in step 410. In step 420, the cloud computing platform calculates an exponentially weighted average for the sending rate of a virtual machine. The exponentially weighted average sending rate (ASR) is evaluated for the virtual machine by the cloud computing platform, where ASR=α*previous_ASR+ (1−α)*current_SR, "α" is set by the cloud computing platform, the "previous_ASR" is the ASR previously evaluated for the virtual machines, and "current_SR" is the current sending rate detected by the cloud computing platform for the virtual machines.

In step 430, the cloud computing platform identifies the desired sending rate for the virtual machine. The desired sending rate (DSR) may be set in a service level agreement for the virtual machine. Alternatively, the desired sending rate may be set by an administrator of the cloud computing platform.

The cloud computing platform also evaluates a drop probability for a communication message sent from the virtual machine, in step 440. The drop probability (DP) is evaluated for the virtual machines by the cloud computing platform, where $$DP = \frac{\beta * (ASR - DSR)}{ASR},$$

"β" is set by the cloud computing platform.

In step 450, the cloud computing platform drops a communication message when a nonce generated, by the cloud computing platform, for the virtual machines is greater than the drop probability. The nonce (η) is randomly generated for the virtual machines by the cloud computing platform, where $$\eta = \frac{Random\_Number}{Maximum\_Random\_Number},$$

"Random_Number" is generated by the cloud computing platform, and "Maximum_Random_Number" is set by the cloud computing platform. In an embodiment, the communication message may be a packet. The method terminates in step 460.

In summary, the cloud computing platform shapes communication traffic associated with virtual machines executing on cloud devices. The cloud computing platform monitors the communication rates and attempts to maintain an appropriate rate of communication for each virtual machine in the cloud computing platform. The service level agreements associated with the virtual machines are processed by the cloud computing platform to ensure an appropriate level of service is maintained for the virtual machines.

The foregoing descriptions of the embodiments of the invention are illustrative, and modifications in configuration and implementation are within the scope of the current description. For instance, while the embodiments of the invention are generally described with relation to FIGS. 1-4, those descriptions are exemplary. Although the subject matter has been described in language specific to structural features or methodological acts, it is understood that the subject matter defined in the appended claims is not necessarily limited to the specific features or acts described above. Rather, the specific features and acts described above are disclosed as example forms of implementing the claims. The scope of the embodiment of the invention is accordingly intended to be limited only by the following claims.

The technology claimed is:

1. A datacenter platform that utilizes one or more processors configured to perform steps that limit transmission communication messages, the steps comprising:
   detecting congestion on a network servicing virtual machines running one or more datacenter applications;
   confirming whether specified communication rates for the virtual machines in the datacenter platform are achieved; and
   dropping communication messages for the virtual machines based on whether the specified communication rates are achieved.

2. The datacenter platform of claim 1, wherein the specified communication rates are determined by a service level agreement.

3. The datacenter platform of claim 1, wherein the specified communication rates are set based on the congestion detected on the network.

4. The datacenter platform of claim 3, wherein the specified communication rates are set by an administrator.

5. The datacenter platform of claim 3, wherein the specified communication rates are set automatically.

6. The datacenter platform of claim 3, wherein the specified communication rates are automatically decreased as congestion on the communication network increases.

7. The datacenter platform of claim 1, wherein the specified communication rates comprise a desired communication rate.

8. A system for limiting transmission communication messages, comprising:
   computing devices;
   one or more hardware computer-readable media having embodied thereon computer-useable instructions that, when executed by one or more of the computing devices, provide one or more virtual machines;

one or more hardware computer-readable media having embodied thereon computer-useable instructions that, when executed by one or more of the computing devices, perform the steps of:
- detecting congestion on a network servicing the virtual machines running one or more datacenter applications;
- confirming whether specified communication rates for virtual machines in the datacenter platform are achieved; and
- dropping communication messages for the virtual machines based on whether the specified communication rates are achieved.

9. The system of claim 8, wherein the specified communication rates are set based on one or more of a service level agreement, the congestion detected on the network, or by an administrator.

10. The system of claim 8, wherein the specified communication rates are set automatically.

11. The system of claim 8, wherein dropping communication messages comprises randomly dropping a communication message.

12. The system of claim 8, wherein a communication message is randomly dropped when a drop probability for the virtual machines is greater than a nonce generated by a datacenter platform.

13. The system of claim 10, wherein the specified communication rates are automatically decreased as congestion on the communication network increases.

14. The system of claim 8, wherein the specified communication rates comprise a desired communication rate.

15. One or more hardware computer-readable media having embodied thereon computer-useable instructions that, when executed, perform steps comprising:
- detecting congestion on a network servicing virtual machines running one or more datacenter applications, wherein the congestion is detected by way of a controller that monitors virtual machine communication traffic on the network;
- confirming whether specified communication rates for the virtual machines in the datacenter platform are achieved; and
- dropping communication messages for the virtual machines based on whether the specified communication rates are achieved, wherein dropping communication messages comprises randomly dropping a communication message.

16. The media of claim 15, wherein the specified communication rates are set based on one or more of a service level agreement, the congestion detected on the network, or by an administrator.

17. The media of claim 15, wherein the specified communication rates are set automatically.

18. The media of claim 15, wherein the specified communication rates comprise a desired communication rate.

19. The media of claim 15, wherein the communication message is randomly dropped when a drop probability for the virtual machines is greater than a nonce generated by a datacenter platform.

20. The media of claim 19, wherein the nonce comprises a ratio of a random number generated by a nonce engine to a maximum random number generated by the nonce engine.

* * * * *